July 1, 1952 — J. S. WOODWARD — 2,601,777
DENSITY MEASURING DEVICE
Filed Jan. 16, 1946
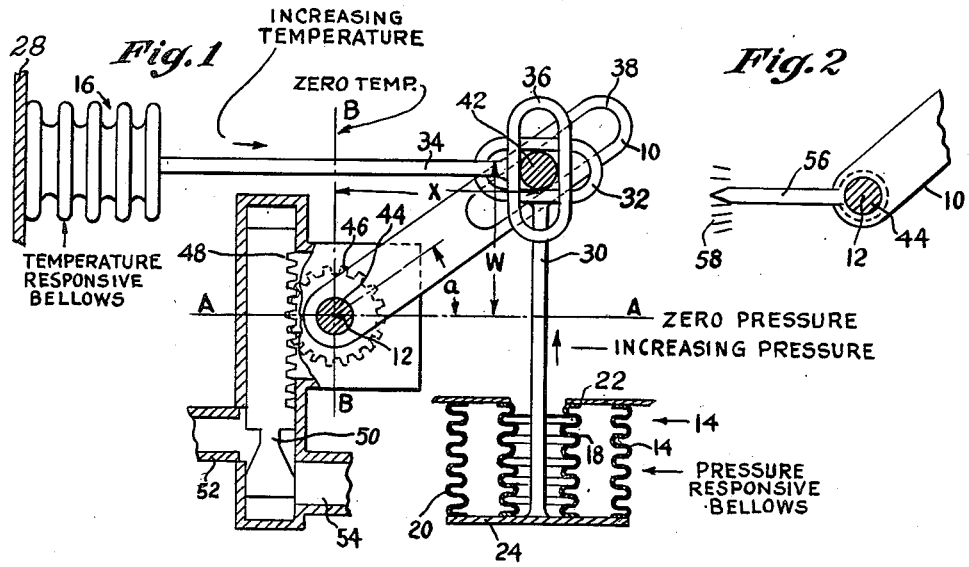
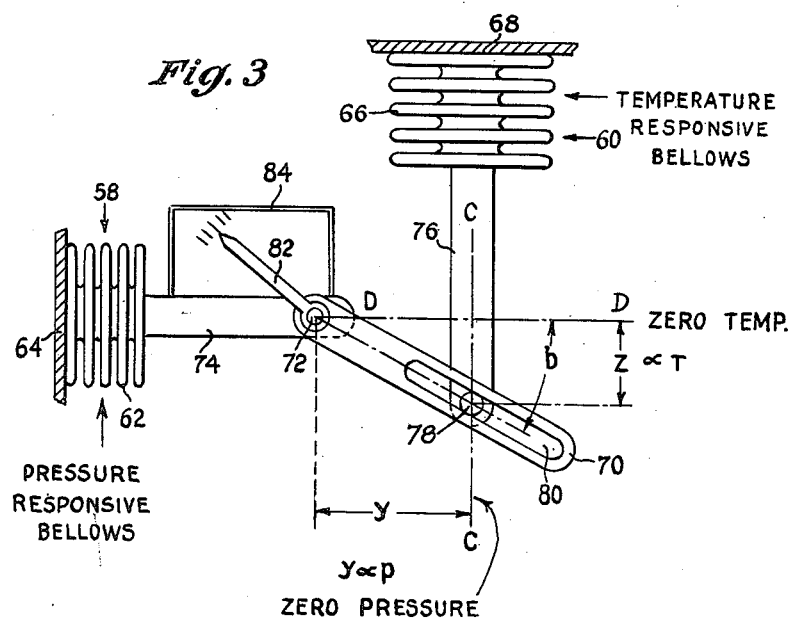
INVENTOR.
James S. Woodward
BY
ATTORNEY Patented July 1, 1952

2,601,777

UNITED STATES PATENT OFFICE 2,601,777

DENSITY MEASURING DEVICE

James S. Woodward, Cheshire, Conn., assignor, by mesne assignments, to Niles-Bement-Pond Company, West Hartford, Conn., a corporation of New Jersey Application January 16, 1946, Serial No. 641,450

14 Claims. (Cl. 73—30)

The invention relates to a mechanism responsive to air density and adapted for use in conjunction with airplane carburetors or other apparatus wherein air density is an important factor. The principal object of the invention is to provide a simple and reliable mechanism for the purpose stated and to eliminate errors and inaccuracies which have been unavoidable in prior mechanismes intended for the same general purpose.

The invention utilizes the principle that air density varies directly with the air pressure and inversely with the air temperature. A member or arm is provided which is movable about a pivotal axis and two means are provided in association with the pivoted arm, one means being responsive to air pressure and the other means being responsive to air temperature. These two means are so connected with the pivoted arm that the arm is moved in one direction in accordance with increases in pressure and in the opposite direction in accordance with decreases in pressure, and that the arm is moved in the first said direction in accordance with decreases in temperature and in the opposite direction in accordance with increases in temperature. The net result is that the extent of pivotal movement of the arm represents changes in air density and that the position of the arm corresponds to air density.

Great accuracy is attained by properly relating the various parts of the mechanism to reference planes which represent absolute zero pressure and absolute zero temperature, as will hereinafter more fully appear.

Other objects and advantages of the present invention will become apparent from a consideration of the appended specification, claims and drawings, in which:

Fig. 1 is a diagrammatic view of a mechanism embodying the invention.

Fig. 2 is a diagrammatic view of an alternative mechanism embodying the invention.

Fig. 3 is a diagrammatic view of another alternative mechanism embodying the invention.

Referring to Fig. 1, there is provided an arm 10 pivotally movable about an axis at 12, the axis in this instance being in fixed position. The two means responsive respectively to air pressure and air temperature are shown at 14 and 16. The pressure responsive means 14 and the temperature responsive means 16 may be of any usual or preferred type, and those shown are intended to be merely illustrative.

As shown, the pressure responsive means 14 comprises two concentric expansible and contractable bellows 18 and 20 closed at one end by a fixed plate 22 and closed at the other end by a movable plate 24. The space between the two bellows and between the plates 22 and 24 is evacuated, and the bellows are contracted and expanded proportionately to increases and decreases in the ambient air pressure. The temperature responsive means 16 comprises a single collapsible and expansible bellows closed at its ends and carried at one end by a fixed plate 28. The space within the bellows 16 is filled with a suitable liquid and with the vapor of the same liquid, and it will be understood that the vapor within the bellows exerts a pressure proportionate to the temperature. The bellows 16 is expanded and contracted proportionately to increases and decreases in the ambient air temperature.

Connected respectively with the pressure responsive means 14 and with the temperature responsive means 16 are two devices which cooperate with the arm 10 to move it in accordance with the movements of the pressure responsive means and the temperature responsive means. Preferably, and as shown, the device connected with the pressure responsive means 14 is a rod 30 connected with the plate 24 and carrying a transversely slotted crosshead 32. The device connected with the temperature responsive means 16 is a rod 34 carrying a transversely slotted crosshead 36. The arm 10 is provided with a longitudinal slot 38. A pin 42 projects thru and fits the slot 38 and the two slots in the crossheads 32 and 36. Suitable means (not shown) are provided to prevent endwise movement of pin 42.

It will be observed that the two devices 30 and 34 are operable simultaneously but independently of each other to move the arm 10, the said devices serving to pivotally move the arm 10 to an extent dependent on the amounts of movement of the corresponding pressure responsive and temperature responsive means. The said devices 30 and 34 act upon the arm at the same side of its pivotal axis. If it be assumed that the temperature remains constant, the device 30 with its crosshead will move upward and will move the arm 10 in the counterclockwise direction as the air pressure increases and will move downward and move the arm in the clockwise direction as the pressure decreases. Thus, counterclockwise movement effected by the device 30 represents increased air density and clockwise movement represents decreased air density. If it be assumed that the pressure remains constant, the device 34 with its crosshead will move toward the left and will move the arm in the counterclockwise direction as the air temperature decreases and will move toward the right and will move the arm in the clockwise direction as the air temperature increases. It will be observed that counterclockwise movement effected by the device 34 represents increased air density and that clockwise movement represents decreased air density. Actually, the air pressure and the air temperature may change simultaneously but nevertheless movement of the arm 10 in the counterclockwise direction always represents increased air density and movement of the arm 10 in the clockwise direction always represents decreased air density.

Preferably, in order to attain a high degree of accuracy, the axis 12 for the pivoted arm 10 is positioned at the intersection of two reference planes A—A and B—B which are perpendicular to each other. The plane A—A is perpendicular to the direction of movement of the pressure responsive means 14 and its associated device 30 and is so related to the pressure means as to represent absolute zero pressure. In other words, the reference plane A—A is so located that the pressure responsive means 14, if it were capable of responding to absolute zero pressure, would move the axis of the pin 42 into the said plane. The plane B—B is perpendicular to the direction of movement of the temperature responsive means 16 and its associated device 34 and is so related to the temperature responsive means as to represent absolute zero temperature. In other words, the reference plane B—B is so located that the temperature responsive means 16, if it were capable of responding to absolute zero temperature, would move the axis of the pin 42 into the said plane.

With the parts in the positions shown, the arm 10 is at the angle $a$ with respect to the reference plane A—A. The tangent of the angle $a$ is represented by $$\frac{w}{x}$$

it being apparent that $w$ represents the absolute pressure and that $x$ represents the absolute temperature. If it be assumed that the temperature remains constant, $w$ varies directly with the pressure and thus the tangent of the angle $a$ varies directly with the pressure. The cotangent of the angle $a$ is represented by $$\frac{x}{w}$$

If it be assumed that the pressure remains constant, $x$ varies directly with the temperature and thus the cotangent of the angle $a$ varies directly with the temperature. Inasmuch as the cotangent of the angle $a$ varies directly with the temperature, it will be evident that the tangent of the angle $a$ varies inversely with the temperature.

From the foregoing description it will be observed that the tangent of the angle $a$ is increased directly in proportion to increases in pressure and decreased directly in proportion to decreases in pressure, and it will also be observed that the tangent of the angle $a$ is decreased directly in proportion to increases in temperature and increased directly in proportion to decreases in temperature. Thus the tangent of the angle $a$ is increased directly in proportion to increases in pressure and decreases in temperature and is decreased directly in proportion to decreases in pressure and increases in temperature. In other words, the tangent of the angle $a$ equals the ratio between the distance representing the absolute pressure and the distance representing the absolute temperature, and it varies directly with and corresponds to the air density.

The angular movement of the arm 10 can be utilized in various ways. As shown in Fig. 1, the arm 10 is mounted on a shaft 44 which carries a pinion 46. The pinion meshes with a rack 48 carried by or formed on a movable valve member 50. The valve member 50, when moved by the rack and pinion, serves to partly open or partly close the passageway between two conduits 52 and 54, and may thus be utilized to control the ratio of fuel to air in a carburetor adapted for airplane use. The valve 50 can be regarded as having the same function as the density compensating valve 111 shown and described in the copending application of Milton E. Chandler, Serial No. 490,281, filed June 10, 1943, now Patent No. 2,393,144.

Instead of operating a valve, as shown in Fig. 1, the arm 10 may be utilized, as shown in Fig. 2, to operate a pointer or needle 56 which cooperates with a fixed dial or scale 58. It will be understood that the graduations on the scale 58 are so spaced as to represent the tangents of the angle $a$ within the normal operating range of the mechanism. Thus the air density can be read directly on the scale 58. The construction shown in Fig. 2 is otherwise the same as that shown in Fig. 1 and repetition of the description is unnecessary.

Fig. 3 shows an alternative embodiment of the invention which is structurally different from those shown in Figs. 1 and 2 but which nevertheless utilizes the same principle. The pressure responsive means is shown at 58 and the temperature responsive means is shown at 60. The pressure responsive means 58 is similar to the pressure responsive means 14 shown in Fig. 1 except that it has only a single bellows 62, this being mounted on a fixed plate 64. The space within bellows 62 is evacuated, and said bellows, by virtue of its resiliency, contracts and expands proportionately to increases and decreases in ambient air pressure applied to its exterior. The temperature responsive means is similar to the temperature responsive means 16 shown in Fig. 1 and it comprises a single bellows 66 carried by a fixed plate 68. A pivoted arm 70 is provided which is similar in function to the arm 10 shown in Fig. 1, this arm 70 being movable about a pivotal axis at 72.

The device associated with the pressure responsive means 58 for operating the arm 70 is a bar 74 movable by the bellows in accordance with changes in pressure. The arm 70 is pivotally connected with the bar 74 and the axis at 72 is bodily movable with the bar. The device associated with the temperature responsive means 60 for operating the arm 70 is a bar 76 movable by the bellows in accordance with changes in temperature. The bar 76 carries a pin 78 which enters and fits a longitudinal slot 80 in the arm 70.

If it be assumed that the temperature remains constant, the bar 74 will be moved toward the left as the pressure increases, thus moving the arm 70 in the counterclockwise direction. Conversely, if the pressure increases the bar 74 will be moved toward the right, thus moving the arm 70 in the clockwise direction. Thus, counterclockwise movement effected by the bar 74 represents increased air density and clockwise movement represents decreased air density. If it be assumed that the pressure remains constant, the bar 76 will be moved upward as the temperature decreases, and the arm 70 will be moved in the counterclockwise direction. Conversely, the bar 76 will be moved downward as the temperature increases and the arm 70 will be moved in the clockwise direction. It will be observed that counterclockwise movement effected by the bar 76 represents increased air density and that clockwise movement represents decreased air density. Actually, the air pressure and the air temperature may change simultaneously, but nevertheless movement of the arm 70 in the counterclockwise direction always represents increased air density and movement of the arm 70 in the clockwise direction always represents decreased density.

Preferably, in order to attain a high degree of accuracy the axis of the pin 78 moves in a reference plane C—C which is perpendicular to the direction of movement of the bar 74 and which is so related to the pressure means 58 as to represent absolute zero pressure. In other words, the reference plane C—C is so located that the pressure responsive means 58, if it were capable of responding to absolute zero pressure, would move the pivotal axis 72 into the said plane. The said axis 72 is movable in a reference plane D—D which is so related to the temperature responsive means 60 as to represent absolute zero temperature. In other words, the reference plane D—D is so located that the temperature responsive means 60, if it were capable of responding to absolute zero temperature, would move the axis of the pin 78 into the said plane.

With the parts in the positions shown, the arm 70 is at the angle $b$ with respect to the reference plane D—D. The cotangent of the angle $b$ is represented by $$\frac{y}{z}$$

it being apparent that $y$ represents the absolute pressure and that $z$ represents the absolute temperature. If it be assumed that the temperature remains constant, $y$ varies directly with the pressure and thus the cotangent of the angle $b$ varies directly with the pressure. The tangent of the angle $b$ is represented by $$\frac{z}{y}$$

If it be assumed that the pressure remains constant, $z$ varies directly with the temperature and thus the tangent of the angle $b$ varies directly with the temperature. Inasmuch as the tangent of the angle $b$ varies directly with the temperature, it will be evident that the cotangent of the said angle $b$ varies inversely with the temperature.

From the foregoing description it will be observed that the cotangent of the angle $b$ is increased directly in proportion to increases in pressure and decreased directly in proportion to decreases in pressure, and it will also be observed that the cotangent of the angle $b$ is decreased directly in proportion to increases in temperature and increased directly in proportion to decreases in temperature. Thus, the cotangent of the angle $b$ is increased directly in proportion to increases in pressure and decreases in temperature, and is decreased directly in proportion to decreases in pressure and increases in temperature. In other words, the cotangent of the angle $b$ equals the ratio between the distance representing the absolute pressure and the distance representing the absolute temperature, and it varies directly with and corresponds to the air density.

The angular movement of the arm 70 can be utilized in various ways, as for instance as described in connection with Figs. 1 and 2. As shown, the arm 70 carries a pointer or needle 82 which cooperates with a dial or scale 84 carried by the movable bar 74. It will be understood that the graduations on the scale 84 are so spaced as to represent the cotangents of the angle $b$ within the normal operating range of the mechanism. Thus, the air density can be read directly from the scale 84.

While I have shown and described certain preferred embodiments of my invention, other modifications thereof will readily occur to those skilled in the art, and I therefore intend my invention to be limited only by the appended claims.

I claim as my invention:

1. A device responsive to air density comprising in combination, a pivoted arm, two means operable independently of each other for pivotally moving the arm to an extent varying with changes in air density, one of the said means being responsive to air pressure and pivotally moving the arm in one direction in accordance with increases in pressure and in the opposite direction in accordance with decreases in pressure and the other said means being responsive to air temperature and pivotally moving the arm in the first said direction in accordance with decreases in temperature and in the opposite direction in accordance with increases in temperature, a needle moved by the arm through an indicating range frictionally proportional to the movement of the free end of said arm, and a graduated scale associated with the needle to enable the latter to indicate air density.

2. A mechanism responsive to air density comprising in combination, a pivoted arm, and two means operable independently of each other and acting upon the arm at the same side of its pivotal axis for pivotally moving the arm to an extent varying with changes in air density, one of the said means being responsive to air pressure and moving the pivot of said arm in one direction in accordance with increases in pressure and in the opposite direction in accordance with decreases in pressure and the other said means being responsive to air temperature and oscillating the arm about its pivot in accordance with changes in air temperature, whereby the free end of said arm is moved in proportion to variations in air density.

3. A mechanism responsive to air density comprising in combination, an arm movable about a fixed axis, first means separate from but operable by said arm and movable proportionately to the pivotal movement of the arm, and two means operable independently of each other for pivotally moving the arm to an extent varying with changes in air density, one of the said two means being responsive to air pressure and pivotally moving the arm in one direction in accordance with increases in pressure and in the opposite direction in accordance with decreases in pressure and the other said two means being responsive to air temperature and pivotally moving the arm in the first said direction in accordance with decreases in temperature and in the opposite direction in accordance with increases in temperature, whereby the pivotal movement of said first means is proportional to changes in air density.

4. A mechanism responsive to air density comprising in combination, two means responsive respectively to air pressure and to air temperature and movable in directions at right angles to each other, an arm pivotally movable about a fixed axis, a pin guided for movement longitudinally of the arm, and two movable crossheads connected respectively with the pressure responsive means and with the temperature responsive means and each having a transverse slot which receives the pin, the said crossheads cooperating with the pin to pivotally move the arm in one direction or the other in direct proportion to changes in air density.

5. A mechanism responsive to air density comprising in combination, a pivoted arm, means for supporting the arm and movable to move the pivotal axis thereof, and two means operable independently of each other and responsive respectively to air pressure and to air temperature, a device connected with one of the last said means and engaging the arm at positions spaced from the pivotal axis thereof for pivotally moving the arm, and a device connected with the other of the last said means for bodily moving the supporting means for the arm to move the axis thereof and thus pivotally move the arm, whereby the pivotal movement of the arm is directly proportional to changes in air density.

6. A device responsive to air density comprising in combination, a pivoted arm, means for supporting the arm and movable to move the pivotal axis thereof, two means operable independently of each other and responsive respectively to air pressure and to air temperature, and two devices connected respectively with the last said means for enabling them to pivotally move the arm, one of the said devices engaging the arm at positions spaced from the pivotal axis thereof for moving the said arm and the other of the said devices bodily moving the supporting means for the arm to move the pivotal axis thereof and thus pivotally move the arm, the device connected with the pressure responsive means serving to pivotally move the arm in one direction in accordance with increases in pressure and in the opposite direction in accordance with decreases in pressure and the device connected with the temperature responsive means serving to pivotally move the arm in the first said direction in accordance with decreases in temperature and in the opposite direction in accordance with increases in temperature, whereby the pivotal movement of the arm is directly proportional to changes in air density.

7. In a mechanism responsive to air density, the combination of, two means responsive respectively to air pressure and to air temperature and movable in directions at right angles to each other, an arm pivotally movable about a fixed axis at the intersection of two reference planes, one of the said reference planes being perpendicular to the direction of movement of the pressure responsive device and at a position representing absolute zero pressure and the other of the said reference planes being perpendicular to the direction of movement of the temperature responsive means and at a position representing absolute zero temperature, and two independently and simultaneously operable devices respectively connected with the pressure responsive means and with the temperature responsive means and serving to move the arm, the device connected with the pressure responsive means serving in the event that the temperature responsive means remains stationary to so move the arm that the tangent of the angle of the arm with respect to one reference plane is changed proportionately to the change in absolute pressure and the device connected with the temperature responsive means serving in the event that the pressure responsive means remains stationary to so move the arm that the cotangent of the aforesaid angle is changed proportionately to the change in absolute temperature, whereby the pivotal movement of said arm is directly proportional to the absolute air density.

8. In a mechanism responsive to air density, the combination of, two means responsive respectively to air pressure and to air temperature and movable in directions at right angles to each other, an arm pivotally movable about a fixed axis at the intersection of two reference planes, one of the said reference planes being perpendicular to the direction of movement of the pressure responsive device and at a position representing absolute zero pressure and the other of the said reference planes being perpendicular to the direction of movement of the temperature responsive means and at a position representing absolute zero temperature, a pin guided for movement longitudinally of the arm, and two movable crossheads connected respectively with the pressure responsive means and with the temperature responsive means and each having a transverse slot which receives the pin, the crosshead connected with the pressure responsive means serving in the event that the temperature responsive means remains stationary to so move the arm that the tangent of the aforesaid angle is changed proportionately to the change in absolute pressure and the crosshead connected with the temperature responsive means serving in the event that the pressure responsive means remains stationary to so move the arm that the cotangent of the aforesaid angle is changed proportionately to the change in absolute temperature, whereby the pivotal movement of the arm is directly proportional to absolute air density.

9. In a mechanism responsive to air density, the combination of, two means responsive respectively to air pressure and to air temperature and movable in directions at right angles to each other, a pivoted arm movable with respect to two reference planes, one of the said reference planes being perpendicular to the direction of movement of the pressure responsive device and at a position representing absolute zero pressure and the other of the said reference planes being perpendicular to the direction of movement of the temperature responsive means and at a position representing absolute zero temperature and one of the planes passing through the pivotal axis of the arm, and two independently and simultaneously operable devices respectively connected with the pressure responsive means and with the temperature responsive means, one of the said devices bodily moving the axis of the arm along the last said reference plane and thus pivotally moving the arm to change the cotangent of the angle between the arm and the said plane proportionately to the movement of the corresponding responsive means and the other of the said devices engaging the arm at positions spaced from the pivotal axis thereof and within the other reference plane for pivotally moving the arm to change the tangent of the angle thereof with respect to the first said reference plane proportionately to the movement of the corresponding responsive means, whereby the pivotal movement of the arm is directly proportional to absolute air density.

10. In a mechanism responsive to air density, the combination of, two means responsive respectively to air pressure and to air temperature and movable in directions at right angles to each other, a pivoted arm movable with respect to two reference planes, one of the said reference planes being perperdicular to the direction of movement of the pressure responsive device and at a position representing absolute zero pressure and the other of the said reference planes being perpendicular to the direction of movement of the temperature responsive means and at a position representing absolute zero temperature and one of the planes passing through the pivotal axis of the arm, and two independently and simultaneously operable devices respectively connected with the pressure responsive means and with the temperature responsive means, the device connected with the pressure responsive means bodily moving the axis of the arm along the last said reference plane and thus pivotally moving the arm to change the cotangent of the angle between the arm and the said plane proportionately to the movement of the said pressure responsive means and the device connected with the temperature responsive means engaging the arm at positions spaced from the pivotal axis thereof and within the other reference plane for pivotally moving the arm to change the tangent of the angle thereof with respect to the first said reference plane proportionately to the movement of the said temperature responsive means, whereby the pivotal movement of the arm is directly proportional to absolute air density.

11. A device responsive to air density comprising a pivoted arm, and two means operable independently of each other for pivotally moving said arm to an extent proportional to changes in atmospheric density, one of said means including a pressure responsive element which moves rectilinearly in proportion to variations of atmospheric pressure and imparts a direct reciprocative thrust along the axis of its movement to said arm, and the other of said means including a temperature responsive element which moves rectilinearly in proportion to variations of atmospheric temperature and imparts a direct reciprocative thrust along the axis of its movement to said arm, whereby said arm is moved pivotally in proportion to variations of atmospheric density.

12. A device according to claim 11 in which the two means act in directions at right angles to each other.

13. A device according to claim 11 in which the movable elements of said means move in lines at right angles to each other.

14. A device according to claim 11 in which said arm moves pivotally about a point which corresponds to the absolute zero temperature and pressure positions of said means.

JAMES S. WOODWARD.

REFERENCES CITED

The following references are of record in the file of this patent:

UNITED STATES PATENTS

| Number | Name | Date |
|---|---|---|
| 1,771,646 | Miquelon | July 29, 1930 |
| 2,070,842 | Reichel et al. | Feb. 16, 1937 |
| 2,366,566 | Shivers | Jan. 2, 1945 |
| 2,388,027 | Weil | Oct. 30, 1945 |
| 2,491,548 | Branson | Dec. 20, 1949 |

FOREIGN PATENTS

| Number | Country | Date |
|---|---|---|
| 309,469 | Germany | Nov. 18, 1918 |
| 374,730 | Germany | Apr. 27, 1923 |
| 592,923 | France | May 11, 1925 |
| 823,949 | France | Oct. 25, 1937 |